United States Patent [19]

Abel et al.

[11] Patent Number: 4,880,564

[45] Date of Patent: Nov. 14, 1989

[54] ANTIFOAMS FOR AQUEOUS SYSTEMS AND THEIR USE

[75] Inventors: Heinz Abel, Reinach; Christian Guth, Birsfelden; Hans-Ulrich Berendt, Allschwil, all of Switzerland

[73] Assignee: Ciba-Geigy Corporation, Ardsley, N.Y.

[21] Appl. No.: 99,034

[22] Filed: Sep. 21, 1987

[30] Foreign Application Priority Data

Sep. 29, 1986 [CH] Switzerland ............... 3889/86

[51] Int. Cl.$^4$ .................................... B01D 17/00
[52] U.S. Cl. ................................ 252/321; 252/358
[58] Field of Search ......................... 252/321, 358

[56] References Cited

U.S. PATENT DOCUMENTS

| | | | |
|---|---|---|---|
| 2,748,086 | 5/1956 | Monson | 252/321 |
| 3,235,499 | 2/1966 | Waldmann | 252/49.6 |
| 3,657,136 | 4/1972 | Lieberman | 252/321 |
| 3,697,442 | 10/1972 | Lieberman | 252/321 |
| 3,730,907 | 5/1973 | Shane | 252/358 |
| 3,756,918 | 9/1973 | Hellwell et al. | 195/28 R |
| 4,021,365 | 5/1977 | Sinka et al. | 252/321 |
| 4,071,468 | 1/1978 | Abel et al. | 252/321 |
| 4,341,656 | 7/1982 | Abel | 252/321 |
| 4,767,568 | 8/1988 | Abel et al. | 252/321 |

FOREIGN PATENT DOCUMENTS

| | | |
|---|---|---|
| 0035702 | 9/1981 | European Pat. Off. . |
| 0207002 | 12/1986 | European Pat. Off. . |
| 2654739 | 8/1977 | Fed. Rep. of Germany . |
| 2705561 | 8/1978 | Fed. Rep. of Germany . |
| 2745583 | 4/1979 | Fed. Rep. of Germany . |
| 2943754 | 5/1980 | Fed. Rep. of Germany . |
| 3242202 | 4/1982 | Fed. Rep. of Germany . |
| 3505742 | 9/1985 | Fed. Rep. of Germany . |
| 1593111 | 7/1981 | United Kingdom . |
| 2112767 | 7/1983 | United Kingdom . |
| 2155004 | 9/1985 | United Kingdom . |

*Primary Examiner*—Josephine Barr
*Attorney, Agent, or Firm*—Edward McC. Roberts

[57] ABSTRACT

Antifoams are described which contain
(1) an alkaline earth metal salt of a $C_{10}$–$C_{24}$-fatty acid,
(2) a dialkyl ester of an unsaturated dicarboxylic acid,
(3) a mineral oil,
(4) a non-ionic emulsifier,
(5) an anionic emulsifier and
(6) an alkylenediamide,
as well as liquid formulations containing such antifoams and their use in a defoaming method for aqueous systems.

12 Claims, No Drawings

ANTIFOAMS FOR AQUEOUS SYSTEMS AND THEIR USE

The present invention relates to antifoams for aqueous systems, to dilute antifoam formulations and to a method for defoaming aqueous systems.

It is already known to treat aqueous systems with antifoams, for example silicone oils, in order to prevent foam formation as far as possible or to eliminate foam which has formed (compare, for example, U.S. Patent Specification 4,071,468). Such antifoams based on silicone oil emulsions are sensitive to high shear forces such as arise during dyeing, especially jet dyeing of fibre substrates. Due to its higher density, the silicone oil is then precipitated, which can cause spots to form on the substrate. To preserve the effectiveness, more antifoam must continuously be added, and this adversely affects the economics of the dyeing process Ep-B 35,702 also has disclosed antifoams which do not contain any silicone oil. However, these antifoams are not sufficiently stable on storage and give application liquors of low stability.

Antifoams have now been found which do not show these disadvantages.

The present invention therefore relates to antifoams for aqueous systems, which comprise (1) 0.5 to 5% by weight of an alkaline earth metal salt of a $C_{10}$-$C_{24}$-fatty acid,
(2) 25 to 45% by weight of a dialkyl ester of an unsaturated dicarboxylic acid,
(3) 25 to 45% by weight of a mineral oil,
(4) 5 to 15% by weight of a non-ionic emulsifier,
(5) 5 to 15% by weight of an anionic emulsifier and
(6) 0.5 to 3.0% by weight of an alkylenediamide.

Salts of calcium, strontium, barium and preferably magnesium can be used as component (1). The magnesium salts of a $C_{18}$-$C_{24}$-fatty acid, especially of stearic and behenic acid and preferably the magnesium salt of stearic acid, are particularly suitable.

Dialkyl esters of ethylenically unsaturated dicarboxylic acids having 2 to 12 C atoms in each alkyl moiety can be used as component (2). The diaalkyl esters are prepared in a manner known per se by reacting a dicarboxylic acid such as maleic or fumaric acid or the anhydride thereof with an alkanol having 2 to 12 C atoms, such as ethanol, propanol, isopropanol, butanol and isomers thereof, amyl alcohol and isomers thereof, n-hexyl alcohol, n-octyl alcohol, capryl alcohol, 2-ethylhexanolk, 2-butylhexanol, trimethylhexanol, n-decyl alcohol and lauryl alcohol. The reaction product of maleic acid or its anhydride with 2-ethylhexanol is preferred.

Commercially available hydrocarbon mixtures can be used as component (3), for example paraffin oil or mixtures of 45 to 70% by weight of paraffins, 25 to 45% by weigt of naphthenes and 5 to 10% by weight of aromatics. Such mixtures have as a rule a flashpoint above 100° C., a so-called "pour point" of −3° to −60° C. and an aniline point of 70° to 110° C. Examples of such commercially available hydrocarbon mixtures are the mineral oils ESSO 301 ®, ESSO 302 ®, ESSO 303 ®, ESSO 304 ®, ESSO 310 ®, ESSO 311 ®, ESSO 312 ®and Shell Oil L 6189 ®.

Reaction products of alcohols or alkylphenols with an alkylene oxide, for example alkylene oxide reaction products of aliphatic alcohols having 4 to 22 carbon atoms, which contain up to 80 mol of added ethylene oxide and/or propylene oxide, can be used as component (4). The alcohols can preferably contain 4 to 18 carbon atoms, they can be saturated, branched or straight-chain and can be used individually or as a mixture. Alcohols with branched chains are preferred.

Natural alcohols, for example myristyl alcohol, cetyl alcohol, stearyl alcohol, oleyl alcohol, arachidyl alcohol or behenyl alcohol, or synthetic alcohols especially butanol, 2-ethylhexanol, anyl alcohol, n-hexanol and also triethylhexanol, trimethylnonyl alcohol or Alfols (trade name - Continental Oil Company) can be used. The Alfols are linear primary alcohols. The number after the name indicates the average carbon number of the alcohol; thus, for example, Alfol (1218) is a mixture of decyl, dodecyl, tetradecyl, hexadecyl and octadecyl alcohols. Further representatives are the Alfols (810), (1014), (12), (16), (18) and (2022).

Preferred ethylene oxide/alcohol reaction products can be represented, for example, by the formula $$R_3O(CH_2CH_2O)_sH \qquad (1)$$

in which $R_3$ is a saturated or unsaturated hydrocarbon radical, preferably an alkyl or alkenyl radical having 8 to 18 carbon atoms, and s is an integer from 1 to 80, preferably 1 to 30.

Reactio products of ethylene oxide and/or 1,2-propylene oxide and alkylphenols ahving 4 to 12 carbon atoms in the alkyl moiety, it being possible for the phenol to contain one or more alkyl substituents, can also be used as component (4). Preferably, these compounds are of the formula

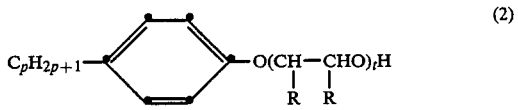

in which R is hydrogen or at most one of the two radicals R is methyl, p is a number from 4 to 12, preferably 8 to 9, and t is a number from 1 to 60, especially from 1 to 20and preferably 1 to 6. If appropriate, these alcohol-/alkylphenol/ethylene or 1,2-propylene oxide adducts can also contain minor proportions of block polymers of the said alkylene oxides.

Further reaction products which can be used as component (4) are polyoxyethylene derivatives of fatty acid esters of the ethers of sorbitan with 4 mol of a polyethylene glycol, for example the laurate, palmitate, stearate, tristearate, oleate and trioleate of the said ethers, such as the Tween brands from Atlas Chemicals Division. The tristearate of the ether if sorbitan with 4 mol of the polyethylene glycol of the formula

is preferred.

Component (5) represents esterified alkylene oxide adducts, for example addition products, containing acidic ester groups of inorganic or organic acids, of alkylene oxides, especially ethylene oxide and/or propylene oxide, to aliphatic organic hydroxyl, carboxyl and, if appropriate, also amino or amido compounds having at least 8 carbon atoms in total, or mixtures of these compounds. These acidic esters can be in the form of free acids or of salts, for example alkali metal, alkaline earth metal, ammoniumm or amine salts.

These anionic surfactants are prepared by known methods, by adding at least 1 mol, preferably more than 1 mol, for example 2 to 60 mol, of ethylene oxide or alternatingly in any order ethylene oxide and propylene oxide to the said organic compounds and then etherifying or esterifying the addition products and, where appropriate, converting the ethers or esters into their salts. Examples fo starting materials are higher fatty alcohols, i.e. alkanols or alkenols having 8 to 22 carbon atoms alicyclic alcohols, phenylphenols, alkylphenols having one or more alkyl substituents having together at least 10 carbon atoms, or fatty acids having 8 to 22 carbon atoms.

Particularly suitable anionic surfactants are of the formula

  (3)

in which $R_1$ is an aliphatic hydrocarbon radical having 8 to 22 carbon atoms or a cycloaliphatic, aromatic or aliphaticaromatic hydrocarbon radical having 10 to 22 carbon atoms, $R_2$ is hydrogen or methyl, A is —O— or

X is the acid radical of an inorganic oxygen-containing acid, the acid radical of a polybasic carboxylic acid or a carboxylalkyl radical and n is a number from 1 to 50.

The radical $R_1$—A— in the compounds of the formula (3) is derived, for example, from higher alcohols such as decyl, lauryl, tridecyl, myristyl, cetyl, stearyl, oleyl, arachidyl or behenyl alochol, and also from alicyclic alcohols such as hydroabietyl alcohol, from fatty acids such as caprylic, capric acid, lauric acid, myristic acid, palmitic acid, stearic acid, arachic acid, behenic acid, coconut fatty acid ($C_8$—$C_{18}$), decenoic acid, dodecenoic acid, tetradecenoic acid, hexadecenoic acid, oleic acid, linoleic acid, linolenic acid, eicosenoic acid, docosenoic or clupanodonic acid, of alkylphenols such as butylphenol, hexylphenol, n-octylphenol, n-nonylphenol, p-tert.-octylphenyl, p-tert.-nonylphenol, decylphenol, dodecylphenol, tetradecylphenol or hexadecylphenol, or from arylphenols such as the o- or p-phenylphenols. Radicals having 10 to 18 carbon atoms, in particular those derived from alkylphenols, are preferred.

The acid radical X is as a rule the acid radical of a polybasic, especially low-molecular mono- or di-carboxylic acid, for example maleic acid, malonic acid, succinic acid or sulfosuccinic acid, or is a carboxyalkyl radical, in particular a carboxymethyl radical (derived especially from chloroacetic acid) and is bound to the radical $R_1$—A—$(CH_2CHR_10)_m$—via an ether or ester bridge. In particular, however, X is derived from inorganic polybasic acids such as orthophosphoric acid and sulfuric acid. The acid radical X is preferably in the form of a salt, for example as the alkali metal, ammoniumm or amine salt. Examples of such salts are sodium, calcium, ammonium, trimethylamine, ethanolamine, diethanolamine or triethanolamine salts. The alkylene oxide untis —$(CH_2CHR_2O)$— of the formula (3) are as a rule ethylene oxide and 1,2-propylene oxide units, the latter preferably being in the form of a mixture with ethylene oxide units in the compounds of the formula (3).

Of particular interest are then the anionic compounds of the formula

  (4)

in which $R_3$ is a saturated or unsaturated hydrocarbon radical having 8 to 22 carbon atoms, o-phenylphenyl or alkylphenyl having 4 to 12 carbon atoms in the alkyl moiety, and X and n are as defined.

Of the compounds derived from alkylphenol/ethylene oxide adducts, those of the fomulae

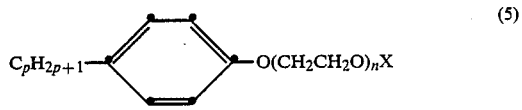  (5)

and

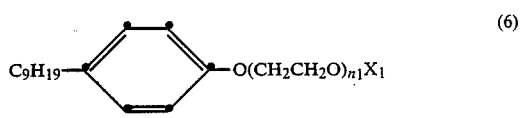  (6)

in which p is an integer from 4 to 12, n is an integer from 1 to 20, $n_1$ is an integer from 1 to 10, $X_1$ is a phosphoric acid radical which may be in the form of a salt, and X is as defined, are also particularly preferred.

Alkylenediamides of the formula

in which $R_3$ is an alkanoyl radical having 14 to 22 C atoms and $R_4$ is an alkylene radical having 2 to 6 C atoms, should be mentioned as component (6).

The alkanoyl radicals $R_3$ can be a myristoyl, palmitoyl, arachinoyl, behenoyl and preferably stearoyl radical, and mixtures of these.

$R_4$ is preferably an ethylene radical.

Preferred antifoams contain
1 to 3% by weight of component (1),
35 to 40% by weight of component (2),
35 to 40% by weight of component (3),
10 to 15% by weight of component (4),
10 to 15% by weight of component (5) and
1 to 2% by weight of component (6).

The antifoams according to the invention can be prepared by mixing components (1), (2), (3) and (6) with stirring at room temperature, heating the mixture with continued stirring to temperatures from 50° to 150° C., preferably 90° to 120° C., for 10 to 60 minutes until they are completely dissolved and, after cooling, adding the solution dropwise with stirring to a mixture of the components (4) and (5) and then allowing the whoel to cool to room temperature with stirring, slightly viscous yellowish, stoprage-stable liquids being obtained.

The antifoams according to the invention can be used in acidic or alkaline formulations (pH range about 1 to 12) and in a wide temperature range, for example 20° to 150° C., without losing their activity. For use in practice, they can be added undiluted or after dilution with organic solvents or water to the aqueous systems, it being possible to employ about 0.1 to 10 g/l, preferably 0.5 to 5 g/l.

If appropriate, the antifoams according to the invention can also be employed in the form of diklute aqueous or organic formulations (solutions), for example as 1 to 99% aqueous solutions or solutiohs in an organic solvent, for example 2-ethyl-n-hexanol or toluene, or solvent mixtures. These dilute antifoam formulations make addition easier, for example when used in printing pastes or dyebaths.

The antifoams according to the invention can be used in the most diverse processes where aqueous or water-containing preparations are used which easily tent to foam, for example (a) dyeing of wool with 1:1 or 1:2 metal complex dyes, acid dyes or reactive dyes, exhaust or continuous dyeing processes for dyeing synthetic polyamide fibres with acid dyes or disperse dyes, dyeing of polyester fibres with disperse dyes, dyeing cellulos fibres with reactive dyes, vat dyes, sulfur dyes and direct dyes, and dyeing polyacrylonitrile fibres with cationic dyes, (b) finishing processes for textile materials: rendering wool or wool-containing fibre mixtures shrink-proof and resistant to felting, desizing cellulose fibre substrates, making cellulose fibre materials flameproof and crease-resistant, rendering various fibre substrates oil-, water- and soil-repellent, antistatic treatment and softening of various fibre substrates, and fluorescent brightening of various fibre substrates, and (c) papermaking (paper fibre suspensions) and paper finishing, especially when sizing paper with aqueous resin formulations or in the surface treatment of paper (paper coating mixtures).

When the said agents are used in dyeing and finishing processes for textile materials, good foam depression is achieved even if other readily foaming agents (surfactants) are used at the same time.

Percentage figures in the examples which follow are per cent by weight.

Preparation instructions

Preparation instruction A: component (2)

49 g of maleic anhydride, 140 g of 2-ethylhexanol, 2 g of sodium hydrogen sulfate and 0.2 g of hydroquinone monomethyl ether are introduced into a sulfation flask with distillation head, stirrer and thermometer and heated with stirring and nitrogen-blanketing to 150° C., water and excess 2-ethylhexanol being distilled off within a period of 4 hours. The reaction mixture is then held for 30 mintues at 150° C. under a water pump vacuum and cooled to room temperature, and the sodium hydrogen sulfate which has precipitated is filtered off. This gives 179 g of the ester as a yellowish clear liquid.

Similar esters which can be used as component (2) are obtained when, with otherwise the same procedure in preparation instruction A, the maleic anhydride and the 2-ethylhexanol are replaced by maleic acid and trimethylhexanol respectively.

Preparation instruction B: component (6)

1,098 g of stearic acid are introduced into a reaction flask with stirrer, cooler, dropping funnel, thermomometer and gas inlet tube, and are melted. The mixture is heated to 150° C. under a nitrogen atmosphere, and 130 g of ethylene diamine are then added dropwise within 30 minutes, water being distilled off. The reaction mixture is heated to 174° C., until distillate no longer separates. The raction mixture is cooled to 145° C. and poured onto a metal sheet, allowed to solidify and ground. This gives a light-beige powder of melting point 141°–142° C.

If the technical mixture of stearic acid and palmitic acid is used in place of stearic acid in otherwise the same procedure, a similar product which can be used as component (6) is obtained. Similar products are also obtained when behenic acid is reacted with rrimethylenediamine or hexamethylenediamine in a molar ration of 2:1.

EXAMPLE 1:

In a stirred vessel, 150 g of component (6) obtained according to preparation instruction B and 200 g of magnesium stearate are dissolved in 3,700 g of component (2) obtained according to preparation instruction A and 3,550 g of mineral oil (for example Shell Oil L 6189 ®) with heating and continuous stirring. When this solution is complete, the mixture is cooled to 45° C. 1,200 g of a non-ionuc emulsifier (for example Tween 65 ®) and 1,200 g of an anionic emulsifier (for example Phospholan PNP 9 ®) are added at 45° C. with stirring to the cooled mixture, and the dispersion is allowed to cool. This gives a yellowish mobile dispersion.

EXAMPLE 2:

In a stirrer vessel, 160 g of trimethylene-dibehenic acid amide and 200 g of barium laurate are dissolved in 3,540 g of paraffin oil with heating to 187° C. and continuous stirring. When the components have completely dissolved, the mixture is cooled to 120° C. and 3,700 go fo di-2-ethylhexyl furarate, 1,200 g of a non-ionic emulsifier (for example an adduct of 35 mol of ethylene oxide to 1 mol of p-nonylphenol) and 1,200 g of an anionic emulsifier (for example the ammonium salt of the acidic sulfate of the aduct of 2 mol of ethylene oxide to 1 mol of p-nonylphenol) are then stirred in. After cooling to room temperature, this gives a brownish turbid, storage-stable liquid.

EXAMPLE 3:

In a stirred vessel, 160 g of hexamethylene-dibehenic acid amide and 200 g of calcium laurate are dissolved in 3,540 g of paraffin oil with heating to 187° C. and continuous stirring. When the components have completely dissolved, the mixture is cooled to 120° C. and 3,700 g of di-2-ethylhexyl citraconate, 1,200 g of a non-ionic emulsifier (for example an adduct of 35 mol of ethylene oxide to 1 mol of p-nonylphenol) and 1,200 g of an anionic emulsifier (for example lauryl triglycol ether-sulfate) are then stirred in. After cooling to room temperature, this gives a brownish, turbid, storage-stable liquid.

EXAMPLE 4:

In a stirred vessel, 160 g of trimethylene-dibehenic acid amide and 200 g of calcium behenate are dissolved in 3,540 g of paraffin oil with heating to 187° C. and continuous stirring. When the components have dissolved completely, the mixture is cooled to 120° C., and 3,700 g of di-trimethylhexyl maleate, 1,200 g of a non-ionic emulsifier (for example an adduct of 100 mol of ethylene oxide to 1 mol of p-nonylphenol) and 1,200 g of an anionic emulsifier (for example the sodium salt of the acidic sulfate of the adduct of 10 mol of ethylene oxide to 1 mol of p-nonylphenol) are then stirred in. After cooling to room temperature, this gives a brownish, turbid, storage-stable liquid.

EXAMPLE 5:

100 kg of cotton tricot are wetted in 600 liters of deionized water at 40° C. in a short-liquor jet. 36 kg of sodium chloride, 5 kg of the commercially available dye of the formula

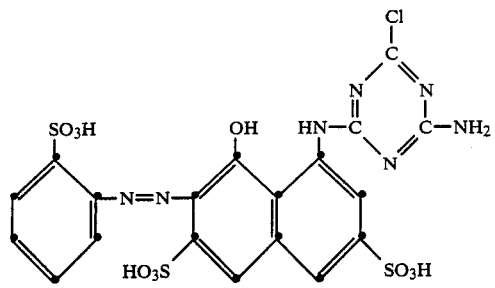

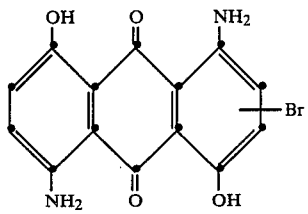

0.6 kg of the adduct of 9 mol of ethylene oxide to 1 mol of p-nonylphenol and 0.5 kg of one of the emulsions according to Examples 1 to 4 are then added to the liquor. The fabric is dyed on the short-liquor jet for 45 minutes at 40° C. This is followed by the addition of 0.6 kg of calcined sodium carbonate and, after a further 5 minutes, of 1.2 kg of an aqueous 46% sodium hydroxide solution. The tricot is then dyed for a further 40 minutes and then washed and rinsed. This gives a fast, level red dyeing of the tricot. During the dyeing process, circulation of the fabric is trouble-free. Foam formation is not detectable. If dyeing is carried out in the same way, but without addition of the emulsion according to one of Examples 1 to 4, vigorous foaming occurs and there is occasional trouble with the circulation of the fabric.

EXAMPLE 6:

In a muff dyeing apparatus, 100 kg of a polyethylene glycol terephthalate yarn in 1,200 liters of water are heated to 60° C. The following additives are then added to the liquor:

2,400 g of ammonium sulfate, 2,000 g of a 70% aqueous solution of the ammonium salt of the acidic sulfate of a condensation product of glycerol and propylene oxide, or molecular weight 4,200, 450 g of the dispersion according to Example 1 and 3,700 g of a commercially available dye of the formula The dyebath is adjusted to pH 5 with 85% formic acid and is heated for 45 minutes to 130° C., whereupon the yarn is dyed for 60 minutes at this temperature. The bath is then cooled and the dyed yarn is rinsed and dried. This gives a deep, level blue dyeing, which is fast to rubbing, on the yarn thus dyed. The dyebath, the overflow vessel and the muffs are completely deaerated by the addition of the emulsion according to Example 1. Without this addition, air is included in the muffs, and less deeply dyed yarn crossover points occur.

EXAMPLE 7:

100 kg of a fabric of 50% of cotton and 50% of polyethylene glycol terephthalate are treated for 20 minutes at 40° C. in a high-temperature winch back with 3,000 parts of an aqueous liquoir of pH 5.6, which contains 54 g of a commercially available dye of the formula

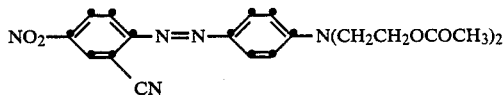

27 g of a commercially available dye of the formula

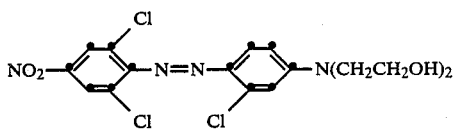

130 g of a commercially available dye of the formula

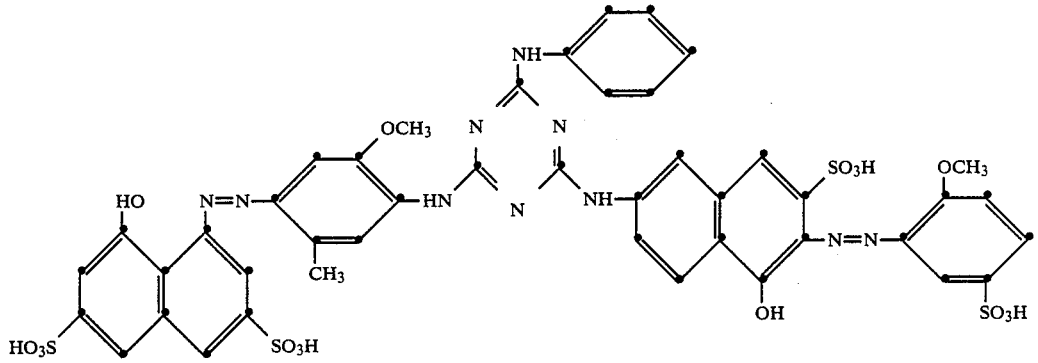

10 g of a commercially available dye of the formula

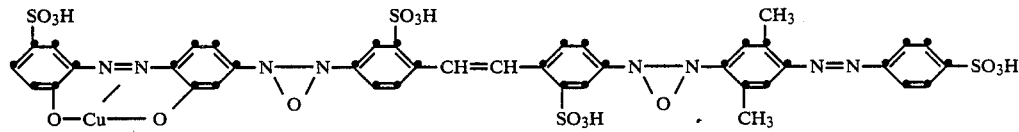

3,000 g of a mixture of
- 16.5% of phenyl benzoate,
- 38.5% of 2-methylphenyl benzoate,
- 8% of ethylene glycol
- 17% of isopropanol,
- 2% of ethanolamine,
- 1.5% of pine oil and
- 16.5% of the acidic phosphoric acid ester of the adduct of 1 mol of p-nonylphenol and 10 mol of ethylene oxide, 6,000 g of ammonium sulfate and 7900 g of the dispersion according to one of Examples 1 to 4. 10 kg of sodium sulfate are then added to the liquor, and the liquor is heated for 40 minutes to 115° C. The fabric is dyed for 30 minutes at this temperature, and the bath is then cooled. The dyed fabric is rinsed and dried.

The addition of the emulsion according to one of Examples 1 to 4 ensures foam-free dyeing. The fabric does not tend to float in the winch back, so that very level dyeing is possible.

EXAMPLE 8:

In a circulation apparatus, a cheese of 70 g of cotton is wetted at 30° C. in 500 ml of water. The following additives are then added to the liquor:
- 12 ml of aqueous 30% sodium hydroxide solution,
- 4.5 g of sodium hydrosulfite,
- 1.0 g of a benzimidazole/fatty acid condensate,
- 0.3 g of the dispersion according to one of Exampls 1 to 4 and
- 0.5 g of a vat dye consisting of a mixture of Vat Blue 4 C.I. 69800 and Vat Blue 5 C.I. 69825 (1:3), which has been predispersed with water. After uniform distribution of the additives, the dye liquor is heated to 60° C. within 30 minutes and the cotton is dyed for 60 minutes at this temperature. The dyed material is then oxidized, soaped, rinsed and dried in the usual way. This gives a level and fast blue dyeing on the cotton thus dyed.

There is no troublesome foam during the dyeing process, as is the case with the same procedure without emulsion according to Example 1.

EXAMPLE 9:

In a hank dyeing apparatus, 100 kg of wool cable yarn are dyed in 3,000 liters of water as follows:

The dye liquor is heated to 40° C. and
- 2,000 g of amonium sulfate,
- 2,000 g of 80% aqueous acetic acid,
- 1,500 g of a mixture of 1 part of an adduct, quaternized with dimethyl sulfate, of 1 mol of fatty acid (technical acid mixture having 18 to 22 carbon atoms) and 30 mol of ethylene oxide and 3 parts of an adduct, cross-linked with sulfamic acid, of 1 mol of tallow fatty acid amide and 16 mol of ethylene oxide, and
- 500 g of the dispersion according to one of Examples 1 to 4 are then added.

The material carrier is then introduced into the dyeing apparatus. The liquor direction is changed every 30 minutes. This is followed by the addition of the dissolved dye, namely 2,000 g of the mixed 1:2 chromum complex of one commercially available dye of the formulae

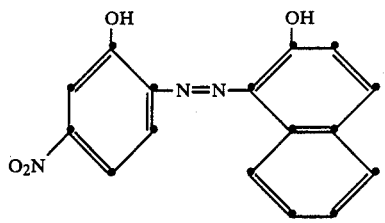

and

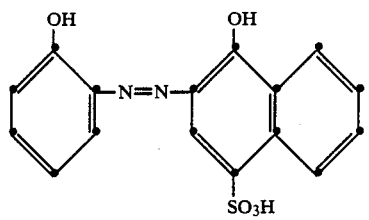

in each case and 2,000 g of the commercially available dye of the formula

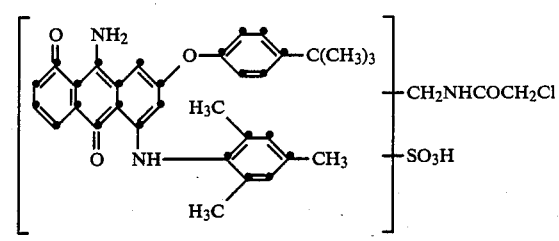

The liquor is then heated to 100° C. within 40 minutes and this temperature is held for 30 minutes. The liquor is then cooled and the fabric is rinsed, dehydrated and dried. This gives a level dyeing. Due to the deaerating and defoaming effect of the emulsion according to one of Examples 1 to 4, the dyeing system remains completely free of foam.

EXAMPLE 10:

In a hank dyeing apparatus, 100 kg of high-bulk polyacrylonitrile yarn in 2,000 liters of water are first shrunk at 90° C. and then cooled to 60° C. The following components are then added to the liquor:

1.5 kg of the commercially available dye of the formula

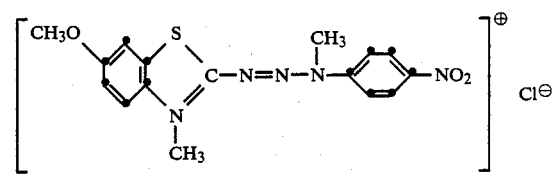

0.13 kg of the dye of the formula

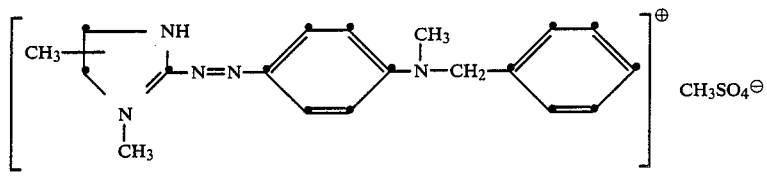

0.5 kg of the dye of the formula

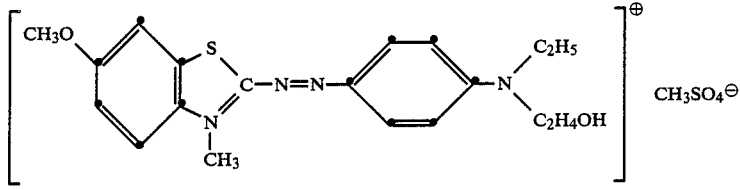 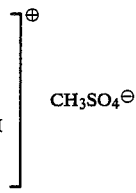

0.87 kg of a cationic retarder, 2 kg of acetic acid (80%), 10 kg of sodium sulfate (anhydrous) and 0.6 kg of the dispersion according to Example 1. After all the additives have been uniformly distributed, the liquor is heated in 45 minutes to the boiling point, and dyeing is carried out for 60 minutes at the boiling point. This is followed by cooling, rinsing, dehydrating and drying. The yarn has a level and fast dyeing. If dyeing is carried out without addition of the emulsion according to Example 1, spotty dyeings are obtained due to channelling and included air.

EXAMPLE 11:

4 g of α-amylase, 3 g of sodium chloride and 1 g of the adduct of 9 mol of ethylene oxide to 1 mol of p-nonylphenol are added per liter to a desizing bath of water of 10° German hardness. The liquor is then tested for foam formation in accordance with DIN 53,902, vigorous foaming being observed.

0.5 g/l of the dispersion according to Example 1 are then introduced into this liquor, and this is then tested again for foam formation, the resulting quantity of foam being much smaller than in the original liquor.

EXAMPLE 12:

Into a bleaching bath of water of 5° German hardness, 1 g of aqueous wetting agent, containing 31.9% of Na pentadecane-1-sulfonate and 10.4% of the adduct of 4 mol of ethylene oxide to 1 mol of a $C_{9-11}$-alkanol, 0.2 g of magnesium sulfate heptahydrate, 2 g of solid sodium hydroxide and 5 ml of 35% hydrogen peroxide per liter are introduced. The liquor is then tested for foam formation in accordance with DIN 53,902, vigorous foaming being observed.

0.5 g/l of the dispersion according to Example 1 are then introduced into this liquor, and it is tested again for foam formation, the resulting quantity of foam being much smaller than in the original liquor.

EXAMPLE 13:

Into a continuous bleaching liquor of water of 5° German hardness, 3 g of an aqueous wetting agent containing 31.9% of Na pentadecane-1-sulfonate and 10.4% of the adduct of 4 mol of ethylene oxide to 1 mol of a $C_{9-11}$-alkanol, 4 g of an aqueous solution containing 8% of sodium gluconate, 7.3% of magnesium chloride hexahydrate and 11.7% of a 60% aqueous solution of a mixture of oligomeric ester condensates of the formula $$CH_3-C(PO_3H_2)_2-O\text{-}[P(O)(OH)-C(PO_3H_2)(CH_3)-O]_{\overline{11-12}}H$$

5 g of solid sodium hydroxide, 5 ml of 38° Bé sodium silicate and 20 ml of 35% hydrogen peroxide per liter are introduced. The liquor is then tested for foam formation in accordance with DI 53,902, vigorous foaming being observed.

1 g/l of the dispersion according to Example 1 is then introduced into this liquor, and it is tested again for foam formation, the resulting quantity of foam being smaller than in the original liquor.

EXAMPLE 14:

500 g of a thickener based on sodium alginate are mixed with 300 g of a 20% aqueous solution of a polyvinyl acetate hydrolyzed to a polyvinyl alcohol with a degree of hydrolysis of about 72 mol % and 200 g of deionized water, to give a stock thickener.

100 g of the dye combination of 20 g* of the yellow dye

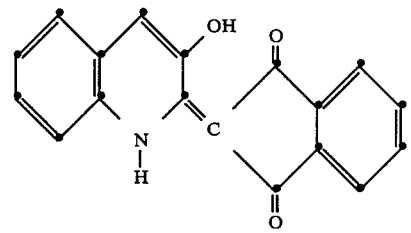

40 g* of the red dye

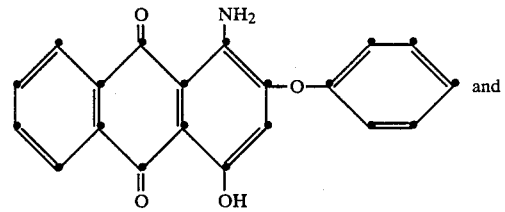

and 40 g* of the blue dye

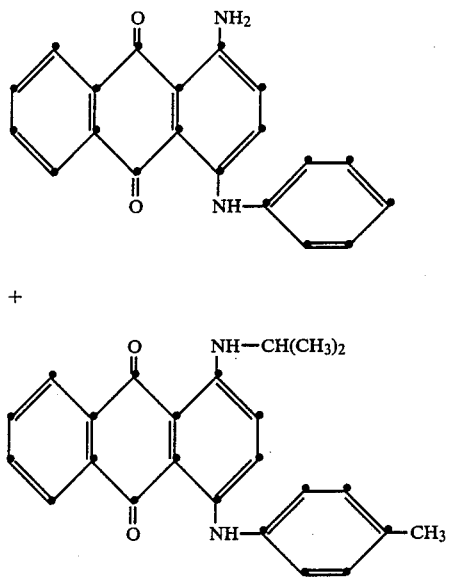

+

(* relates to commercial products) 4 g of the emulsion according to Example 1 and 296 g of water are added to 600 g of this stock thickener and the whole is thoroughly mixed. The printing paste in the form of an emulsion has a viscosity of 300 mPa.s, measured in an RVT Brookfield viscometer with spindle 4 at 20° C. and 20 revolutions/minute.

A temporary support of paper is printed with this printing paste on a rotary screenprinting press and dried for 8 seconds at 100° C.

The printed side of the temporary support is then contacted in the transfer-printing process with a polyester fabric of 100 g/m² weight per unit area, whereupon the temporary support and the fabric are pressed together for 30 seconds at 210° C. in an ironing press, the dye being transferred from the temporary support to the fabric.

The addition of the emulsion according to Example 1 results in a uniform dye application to the paper, so that a level transfer from the paper to the polyester is possible.

What is claimed is:

1. An antifoam for aqueous systems, which comprises
   (1) 0.5 to 5% by weight of an alkaline earth metal salt of a $C_{10}$–$C_{24}$-fatty acid,
   (2) 25 to 45% by weight of a di-$C_2$-$C_{12}$-alkyl ester of an unsaturated dicarboxylic acid,
   (3) 25 to 45% by weight of a mineral oil having a flashpoint above 100° C., a pour-point of −3° to −60° C. and an aniline point of 70° to 110° C.,
   (4) 5 to 15% by weight of a non-ionic emulsifier,
   (5) 5 to 15% by weight of an anionic emulsifier and
   (6) 0.5 to 3% by weight of an alkylenediamide of the formula $R_3$—NH—$R_4$—NH—$R_3$ wherein $R_3$ is an alkanoyl radical having 14 to 22 C atoms and $R_4$ is an alkylene radical having 2 to 6 C atoms.

2. An antifoam according to claim 1, which contains a magnesiumsalt of a $C_{18}$—$C_{24}$-fatty acid as component (1).

3. An antifoam according to claim 2, wherein the magnesium salt of stearic acid is used as component (1).

4. An antifoam according to claim 1k which contains a dialkyl ester of maleic acid, having 8 or 9 C atoms in each alkyl moiety, as component (2).

5. An antifoam according to claim 4, which contains di-2-ethylhexyl maleate as component (2).

6. An antifoam according to claim 5, which contains a polyoxyethylene derivative of fatty acid esters of sorbitan ethers as component (4).

7. An antifoam according to claim 5, which contains a nonylphenol polyglycol ether-phosphate as component (5).

8. An antifoam according to claim 7, which contains the reaction product of ethylenediamine and stearic acid as component (6).

9. An antifoam according to claim 1, which contains
   1 to 3% by weight of component (1),
   35 to 40% by weight of component (2),
   35 to 40% by weight of component (3),
   10 to 15% by weight of component (4),
   10 to 15% by weight of component (5) and
   1 to 2% by weight of component (6).

10. An antifoam formulation diluted with water or organic solvents, which contains 1 to 99% of the antifoam according to claim 1 and 99 to 1% of water or an organic solvent.

11. A method for defoaming an aqueous system or for preventing foam build-up in an aqueous system comprising the step of adding to the aqueous system an antifoam of claim 1 at the rate of about 0.1 to 10 grams of antifoam per liter of aqueous system.

12. A method for defoaming an aqueous system or for preventing foam build-up in an aqueous system comprising the step of adding to the aqueous system an antifoam formulation of claim 10 at the rate of about 0.1 to 10 grams of antifoam formulation per liter of aqueous system.

* * * * *